United States Patent [19]

Hoefer et al.

[11] Patent Number: 5,288,796
[45] Date of Patent: Feb. 22, 1994

[54] FRIABLE SEALING COMPOUND FOR SEALING JOINT BOXES

[75] Inventors: Rainer Hoefer, Dusseldorf; Gerhard Stoll, Korschenbroich; Peter Daute, Essen; Roland Gruetzmacher, Wuelfrath, all of Fed. Rep. of Germany

[73] Assignee: Henkel Kommanditgesellschaft auf Aktien, Duesseldorf, Fed. Rep. of Germany

[21] Appl. No.: 949,508

[22] PCT Filed: May 21, 1991

[86] PCT No.: PCT/EP91/00940

§ 371 Date: Nov. 24, 1992

§ 102(e) Date: Nov. 24, 1992

[87] PCT Pub. No.: WO91/19298

PCT Pub. Date: Dec. 12, 1991

[30] Foreign Application Priority Data

May 30, 1990 [DE] Fed. Rep. of Germany ....... 4017444

[51] Int. Cl.$^5$ .............................................. C08L 75/04
[52] U.S. Cl. ..................................... 524/789; 525/123; 528/53; 528/58; 528/74.5; 427/58; 427/117; 427/385.5

[58] Field of Search ................. 524/789; 525/123; 528/53, 58, 74.5; 427/58, 117, 385.5

[56] References Cited

U.S. PATENT DOCUMENTS

| 4,029,626 | 6/1977 | Gillemot et al. ................... 528/59 |
| 4,680,203 | 7/1987 | Maki et al. ........................ 427/393 |

FOREIGN PATENT DOCUMENTS

| 23201105 | 11/1974 | Fed. Rep. of Germany . |
| 2847383 | 5/1980 | Fed. Rep. of Germany . |
| 39355127 | 4/1991 | Fed. Rep. of Germany . |
| 60-053522 | 3/1985 | Japan . |
| 61-120821 | 6/1986 | Japan . |
| 62-0301159 | 2/1987 | Japan . |

*Primary Examiner*—Maurice J. Welsh
*Attorney, Agent, or Firm*—Ernest G. Szoke; Wayne C. Jaeschke; Daniel S. Ortiz

[57] ABSTRACT

A friable sealing compound of a polyol component containing polyfunctional isocyanates, the polyol component being a mixture of ricinene oil and a predominantly hydroxyl-terminated polybutadiene having an average molecular weight of 1,500 to 4,500 and/or a ring opening product of an epoxidized vegetable oil with unsaturated or saturated short-chain linear or branched $C_{6\text{-}22}$ fatty acids.

20 Claims, No Drawings

FRIABLE SEALING COMPOUND FOR SEALING JOINT BOXES

FIELD OF THE INVENTION

This invention relates to friable sealing compounds of a polyol component and an isocyanate component, for example for sealing cable joint boxes.

In many fields of industry, a housing, a tube or similar articles have to be sealed at their open end(s) so that moisture or water is unable to penetrate.

This applies in particular to cables for the transmission of information, for example in the communications field. These cables are normally laid underground where they are exposed to the effects of their surroundings, for example fluctuating temperatures or fluctuating moisture conditions. When the cables are laid, it is important to ensure that the moisture conditions prevailing inside the cable will not change at some later stage, as might happen through the possible penetration of water or moisture.

BACKGROUND OF THE INVENTION

Communications cables consist of a plurality of electrically conductive wires which are bunched together, several such bunches being accommodated in an outer protective sheath. To join two such cables or even to join cables of different construction to one another, these bunches of wires have to be fanned out and joined to the wires of the other cable. The individual wires thus joined have to be insulated from one another, so that, in some cases, a much more bulky structure is formed. Since the insulation of the individual wires was opened, this structure has to be protected against the penetration of moisture or water. This is done by so-called cable fittings in the form of connectors consisting of a joint box and a plastics material accommodated therein.

The plastics materials used for hermetically sealing hollow articles, particularly cables, have to satisfy a number of requirements:

1. Their viscosity during processing should be low enough to enable the plastics material to penetrate readily between the bunches of wires and between the interconnected wires, even at low temperatures.
2. The self-curing of the material should take place quickly; the so-called pot life in the particular processing temperature range should be at least about 5 minutes.
3. The plastics material must show good self-curing properties at temperatures in the range from −10° to 15° C. so that the cables can be laid at any time of year.
4. The elasticity of the cured plastics material should be high to compensate temperature-induced changes in volume of the metal parts.
5. The adhesive properties of the sealing compound, i.e. its ability to adhere firmly to the constituent material of the joint box, to the insulating material of the individual wires and to the insulating material of the wires joined to one another, should be good.
6. High resistance to moisture and impermeability to water are also important requirements.
7. The cured plastics material should show high notch sensitivity, i.e. should crumble, so that, when the cable joint consisting for example of two joined half shells is opened, the plastic filling can readily be moved by hand without any need for tools.
8. In the cured state, the plastics material should show a high insulation resistance of more than $10^{11}$ cm on exposure to at least 1 kV/mm. The need for a high insulation resistance also applies after storage of the materials in water and various chemicals. The dielectric constant and the loss angle should be as low as possible. If the material comes into contact with acidic or alkaline liquids, it should remain serviceable for at least 36 hours at 38° C. Finally, the plastics material should be resistant to the effect of diesel oil, fungi and microbes.

Hitherto known filling compounds based on various plastics materials, such as polyurethane for example, do not meet these requirements satisfactorily, if at all.

BRIEF SUMMARY OF THE INVENTION

The problem addressed by the present invention was to provide a friable sealing compound, more particularly for sealing cables or cable joints, which satisfactorily meets the requirements stated above.

The problem addressed by the invention is solved by the friable sealing compound claimed in claim 1. Further advantageous embodiments of the invention will become apparent from the other claims.

The friable sealing compound according to the invention is the reaction product of the isocyanate component and a special polyol mixture of polyol components I and II, component I being ricinene oil.

Among the diisocyanate compounds known per se, diphenyl methane-4,4'-diisocyanate is preferably used as the diisocyanate component. It preferably has an effective content of 93%, a viscosity at 20° C. of 100 to 150 mPa.s and an NCO content of 30 to 32%. The effective content is defined as the NCO content in 1 mol diisocyanate. Tris-6-isocyanurate and 1,3,5-tris-(6-isocyanatohexyl)-biuret are also particularly suitable.

The polyol mixture component I (ricinene oil) is formed from castor oil by a special dehydration reaction. In this reaction, a mixture of 9,11- and 9,12-octadecadienoic acids is formed from ricinoleic acid (12-hydroxyoctadec-9-ene carboxylic acid 1), see also Winnacker-Küchler, 4th Edition, Vol. 6, Org., Technologie II, München, Wien 1982, pp. 745 et sec.

The polyol component II consists of component IIa and/or IIb, component IIa being a predominantly hydroxyl-terminated polybutadiene having an average molecular weight of 1,500 to 4,500 and preferably of the order of 2,500, as described for example in DE 28 47 383. Component IIb is a ring opening product of an epoxidized vegetable oil with saturated or unsaturated short-chain linear or branched fatty acids preferably containing from 6 to 22 carbon atoms. Ring opening products such as these are described in DE 39 35 127.0.

The corresponding ring opening product of soybean oil epoxide with saturated linear $C_{6\text{-}10}$ fatty acids is preferred as the polyol component IIb.

DETAILED DESCRIPTION OF THE INVENTION

Although it is known from DE-OS 23 20 105 that a thermoset filling compound can be produced from diisocyanates or castor oil or, instead of castor oil, polyether polyols, it has surprisingly been found that considerably more advantageous friable sealing compounds can be produced with the ricinene oil used in accordance with the invention in combination with the described polyol mixture components IIa and IIb.

The polyol component may additionally contain, for example in one of its mixture components, fillers, for example in powder form, of which the specific gravity is in the same range as the specific gravity of the polyol component. A particularly suitable filler such as this is polyethylene powder which is preferably used in a quantity of 20% by weight, based on the total weight. The fillers may normally be present in quantities of up to 75% by weight.

Other fillers which fulfill the conditions in regard to specific gravity are also suitable. These fillers are known per se and, for the most part, are also cured powderform plastics materials of various compositions. The requirements which the specific gravity has to satisfy are important because otherwise homogeneous distribution of the powder in the sealing compound by sedimentation is not guaranteed either during casting or during the curing process.

Surprisingly, it has been found to be a particular advantage of the friable sealing compounds according to the invention that they can be free from plasticizers. Thus, no external plasticizers, such as dibenzyl toluene or monocyclic terpene hydrocarbons or paraffin oils, need or should be present in the friable sealing compound. It has been found that the external plasticizers gradually migrate so that the initially favorable properties of the friable sealing compound are impaired. The properties of the friable sealing compound change unfavorably with time through migration of the plasticizer. In addition, the plasticizers can enter the cable and cause electrical faults. Finally, these substances can also undesirably enter the soil.

However, it has also been found that there is no need whatever for fillers in the friable sealing compounds according to the invention. The advantage of this is that no solids need be incorporated in the polyol component so that stability in storage is increased because no sedimentation processes can occur.

Providing the polyol component is produced and stored in sufficiently anhydrous form, there is also no need for solid constituents, such as zeolite, otherwise typically present, in particular in quantities of up to 10% by weight, as drying agents. The totally solids-free friable sealing compounds according to the invention are transparent so that, after processing, for example for sealing cables in a joint box, the cable run or rather the wires and the splice joints remain visible, thus significantly facilitating possible searches for defects in such a joint.

The friable sealing compounds according to the invention may contain polymerization accelerators, preferably organotin compounds, such as dibutyl tin dilaurate, or tertiary amines. If the friable sealing compound according to the invention crumbles readily in the absence of polymerization accelerators, but is slightly too tacky, tackiness can be reduced to the necessary and appropriate level by the addition of polymerization accelerator during the production of the friable sealing compound according to the invention. The corresponding quantity to be added may readily be determined by simple small-scale tests; it is important in this regard to ensure that the pot life does not fall below a value of about 5 minutes. The upper limit should not excess 2% by weight.

5 to 30 parts by weight of the diisocyanate component may be used to 100 parts by weight of the polyol mixture according to the invention.

The ratio of polyol component I to polyol component(s) IIa and/or IIb in the polyol mixture is preferably in the range from 20:80 to 80:20 parts by weight.

The polyol mixture according to the invention can contain up to 20% by weight of other polyols, for example the polyether polyester polyols according to DE 28 47 383, and optionally the above-mentioned additives or internal plasticizers (such as Guerbet alcohols, namely 2-octyldodecanol). To produce the friable sealing compounds, (A) and (B) are thoroughly mixed and the resulting mixture is introduced into a joint box surrounding spliced cable ends.

The invention is illustrated by the following tests.
The following products were used.
Polyol component I:
Ricinene oil
OH value: max. 25
Viscosity, 20° C.: approx. 300 mPa.s
Iodine value: approx. 145
Acid value: max. 4
Polyol component IIa:
Polybutadiene diol
Molecular weight: approx. 2,800
OH value: approx. 46.6
Viscosity, 25° C.: approx. 9,000 mPa.s
Iodine value: approx. 400
$H_2O$: <0.1%
Polyol component IIb:
Ring opening product of an epoxidized soybean oil with head-fractionated fatty acid (fatty acid cut containing $C_{6-12}$ monocarboxylic acids)
OH value: 85–100
Viscosity, 25° C.: approx. 4,000 mPa.s
Iodine value: approx. 145
Saponification value: approx. 239
Iodine value: approx. 3.4
$H_2O$: <1%
Diisocyanate component:
Technical diphenylmethane-4,4'-diisocysnate (MDI) polymer (30% NCO content)

The composition and properties of friable sealing compounds according to the invention and of comparison compounds are listed in the following Table.

The friable sealing compounds according to the invention have good crumbling properties. For the special purpose of sealing cables in a joint box, their pot life was too long; in addition, the compound showed phase separation. Phase separation could be eliminated by addition of 0.5 part by weight tertiary amine as catalyst during the production of sealing compound 2; at the same time, a suitable pot life was obtained (sealing compound 3).

For the special purpose of sealing cables in a joint box, however, friable sealing compound 3 was too tacky and its pot life too long. Tackiness could be reduced to an acceptable level by addition of 0.5 part by weight tertiary amine as catalyst during the production of friable sealing compound 4; at the same time, a suitable pot life was obtained.

The main difference between compounds 5 and 6 and the previous friable sealing compounds according to the invention is that, instead of a polyol mixture, the polyol component used was polyol IIb alone in the case of compound 5 and polyol IIa alone in the case of compound 6. In both cases, the friable sealing compounds obtained did not show the crumbling behaviour sought in accordance with the invention.

| | 1 | 2 | 3 | 4 | 5 | 6 |
|---|---|---|---|---|---|---|
| a. Composition of casting resin | | | | | | |
| Individual constituents (parts of weight) | | | | | | |
| I Polyol | 50 | 50 | 50 | 50 | — | — |
| IIa Polyol | — | — | 50 | 50 | — | 100 |
| IIb Polyol | 50 | 50 | — | — | 100 | — |
| Viscosities mPa · s (27° C.) | 520 | 520 | 1300 | 1300 | 3100 | 9000 |
| Diisocyanate MDI polymer, 30% NCO | 16 | 16 | 9 | 9 | 25 | 11 |
| Drying agent zeolite paste (50% in castor oil) | 5 | 5 | 5 | 5 | 5 | 5 |
| Catalyst tert. amine (Dabco 33 LV, Air Products) | | 0.5 | | 0.5 | | 0.5 |
| Pot life (27° C.) | >3 h | ~25 mins. | ~45 mins. | ~13 mins. | ~10 mins. | ~5 |
| b. Properties | | | | | | |
| Shore A hardness (27° C.) | | | | | | |
| after 24 hours | 21° | 20 | 7* | 9 | 56 | 27 |
| after 48 hours | 22° | 21 | 12* | 10 | 58 | 30 |
| after 72 hours | 29° | 21 | 9* | 10 | 61 | 32 |
| after 168 hours | 21° | 29 | 1* | 10 | 61 | 33 |
| Ultimate tensile strength in MPa | | | | $\phi 0.17$ 0.17 | 1.4 1.4 | 0.18 0.18 |
| Elongation in % | | 6.9 | | 28.8 | 38.8 | 79.5 |
| Volume resistivity after 168 h ohm · cm | | $1.85 \cdot 10^{14}$ | | $6.5 \cdot 10^{11}$ | $4.5 \cdot 10^{15}$ | $4 \cdot 10^{16}$ |
| | | Readily crumbled | | | | No crumbling |

*highly tacky
°phase separation c. Water storage test, friable sealing compound of Example 2

Test specimens were completely immersed in water and stored at room temperature.

| | Specific resistivity Ohm · cm | Water absorption % |
|---|---|---|
| Initial | $1.85 \cdot 10^{14}$ | 0 |
| After 1 day | $1.15 \cdot 10^{14}$ | 0.1 |
| After 8 days | $1.05 \cdot 10^{14}$ | 0.2 |
| After 30 days | $6.58 \cdot 10^{13}$ | 0.2 |

We claim:

1. A friable sealing compound system which comprises: a polyol component (A) and an diisocyanate component (B), wherein the polyol component (A) comprises a mixture of ricinene oil (I) and a ring opening reaction product (IIb) of an epoxidized vegetable oil with unsaturated or saturated short-chain linear or branched fatty acids.

2. A friable sealing compound system of claim 1, wherein the diisocyanate component comprises diphenyl methane-4,4'-diisocyanate.

3. A friable sealing compound system of claim 1 wherein the ring opening product (IIb) contains residues of at least one C$_{6-22}$ fatty acid.

4. A friable sealing compound system of claim 1, wherein the system contains from 0 to 75% by weight, of a filler.

5. A friable sealing compound system of claim 1 wherein the system additionally contains 0 to 10% by weight, of a drying agent.

6. A friable sealing compound system of claim 1, wherein the system contains a polymerization accelerator in an amount of 0 to 2% by weight of the system.

7. A friable sealing compound system of claim 1, wherein the ratio by weight of the polyol component to the diisocyanate is from 100:5 to 100:30.

8. A friable sealing compound system of claim 1, wherein the mixing ratio between the mixture components (I) and (IIb) in the polyol component is 20:80 to 80:20 parts by weight.

9. A friable sealing compound system of claim 1, wherein the polyol component contains up to 20% by weight of polyols other than (I) and (IIb) and/or external or internal plasticizers.

10. A process for the production of a friable sealing compound which comprises: mixing a polyol component (A) and a diisocyanate component (B) and introducing the resulting mixture into a joint box surrounding spliced cable ends.

11. A friable sealing compound system of claim 4 wherein the filler comprises polyethylene powder.

12. A friable sealing compound system of claim 5 wherein the drying agent comprises a zeolite.

13. A friable sealing compound system of claim 6 containing at least one polymerization accelerator selected from the group consisting of organotin compounds and tertiary amines.

14. A friable sealing compound system of claim 2 wherein the ring opening product (IIb) contains residues of at least one C$_{6-22}$ fatty acid.

15. A friable sealing compound system of claim 14 further comprising a drying agent.

16. A friable sealing compound system of claim 15 wherein the drying agent is a zeolite.

17. A friable sealing compound system of claim 15 further comprising at least one polymerization accelerator selected from the groups consisting of organotin polymerization accelerators and tertiary amine polymerization accelerators.

18. A friable sealing compound system of claim 17 wherein the ratio by weight of the polyol component to the diisocyanate is from 100:5 to 100:30.

19. A friable sealing compound system of claim 18 wherein the short chain fatty acid comprises a $C_6$-$C_{10}$ fatty acid and the epoxidized vegetable oil comprises epoxidized soy bean oil.

20. A friable sealing compound system of claim 1 wherein the short chain fatty acid comprises a $C_6$-$C_{10}$ fatty acid and the epoxidized vegetable oil comprises epoxidized soy bean oil.

* * * * *